Nov. 26, 1929. O. A. ROSS 1,737,128
ALTERNATING CURRENT INDUCTION MOTOR OR THE LIKE
Filed Oct. 28, 1925
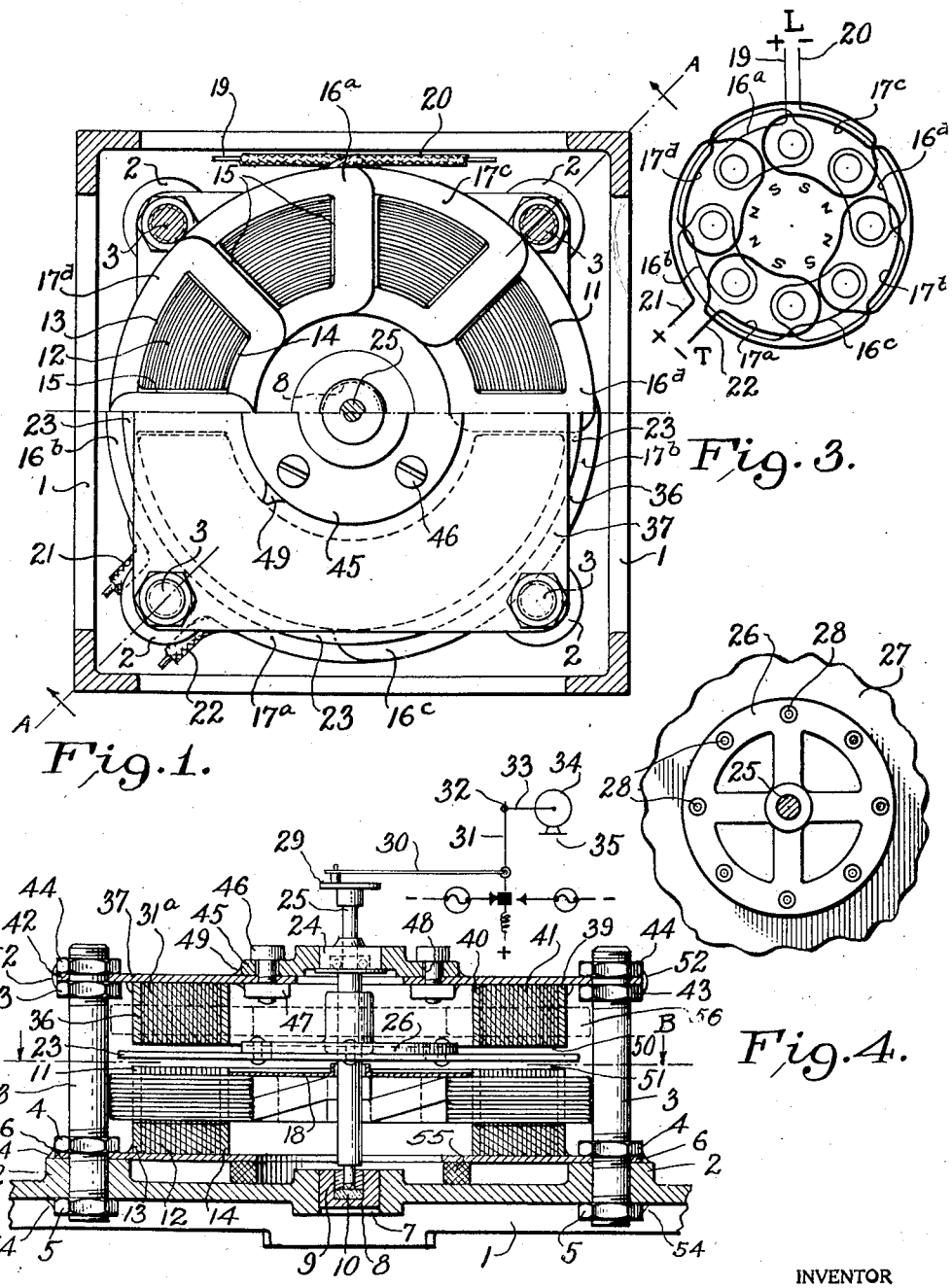
INVENTOR
Oscar A. Ross Patented Nov. 26, 1929

1,737,128

UNITED STATES PATENT OFFICE

OSCAR A. ROSS, OF NEW YORK, N. Y., ASSIGNOR TO GENERAL RAILWAY SIGNAL COMPANY, OF ROCHESTER, NEW YORK

ALTERNATING-CURRENT INDUCTION MOTOR OR THE LIKE

Application filed October 28, 1925. Serial No. 65,398.

This invention relates to alternating current motors and more particularly to that class of motors known as induction motors having non-ferric rotors, this class being extensively employed in the railway signalling art in devices known as alternating current relays.

One object of my invention is to provide a device of low manufacturing cost for which a minimum of special tools and special gauges will be required. I accomplish this by a novel construction permitting simple adjustments for obtaining the desired air-gaps between stator and rotor whereafter the adjustment is sealed against mis-alignment.

Another object is to furnish a device of high efficiency whereby a minimum of energy is required for its operation.

Another object is to produce a motor having a rotor of low inertia factor compared to the torque it is able to produce.

Another object is to produce a motor wherein it is possible to look through the entire air-gap in which the rotor operates.

Another object is to produce a motor having a minimum amount of friction in the moving parts thereby obtaining a high percentage of drop-away. I accomplish this by operating the rotor in a vertical axis in combination with a round ended shaft stepped in a jewel bearing. To those versed in the signalling art the value of a high "drop-away" is well appreciated.

Another object is to produce a motor of substantially low vertical dimensions thereby permitting the manufacture of a signal relay of low vertical dimensions to accommodate the cramped head room in many signal cases.

Another object is to produce a motor adapted to actuate signal relays, and, wherein the winding will be so disposed, that, if overheated, as for example, by an abnormal current from a stroke of lightning, the compound, or paint with which said winding is treated, or impregnated will not flow onto the rotor and cause it to stick in the energized position thereby causing what is known as a clear failure.

Another object is to produce a motor wherein the rotating magnetic field produced in the stator will act on substantially the entire surface of the rotor disk in this manner obtaining a high efficiency motor with a low inertia factor in the rotor.

Other objects and advantages will appear as the description of the invention progresses and the novel features of the invention will be pointed out in the appended claims.

This invention consists in the novel construction and arrangement of parts hereinafter described, delineated in the accompanying drawings, and particularly pointed out in the claims, it being understood that, within the scope of what hereinafter thus is claimed, divers changes in the form, proportions, size and minor details of the structure may be made without departing from the spirit of the invention, or sacrificing any of its details.

In describing the invention in detail, reference is had to the accompanying drawings, wherein I have illustrated one embodiment of the invention, and wherein like characters of reference designate corresponding parts throughout the several views, and in which:—

Figure 1, is a part sectional, part elevational top view of the preferred form of my improved motor, the sectional portion being taken on a plane just below the rotor and substantially along line B—B of Fig. 2; and Fig. 2, is a sectional side view of the same motor taken on line A—A of Fig. 1, it being assumed that the motor is a complete assembly with plate 18 omitted; Fig. 3, is a diagrammatic view of the windings of the stator showing how the revolving magnetic field is produced, and, Fig. 4, is a top view of the center portion of the rotor.

Referring to Figs. 1 and 2, housing, or support 1, more fully described in my co-pending application Serial Number 69,130, filed Oct. 28th, 1925, has machined lugs 2—2, through which pass studs 3—3, nuts 4 and 5, serving to secure said studs and plate 6, of stator 11 in position. Housing 1, also has machined opening 7, containing adjustably mounted bearing 8, comprising sleeve 9, and step bearing 10, both of a hard material as for example glass or jewels.

Stator 11, comprises plate 6, rigidly secured to which is an iron core 12 of laminated iron, preferably of a material composed of 20 per cent iron and 80 per cent nickel, such metal having a very high permeability. Said core 12, comprises outer band 13, inner band 14, and a laminated section 12a, said core having radially disposed slots 15—15, (to form teeth or pole pieces) containing coils as 16a, 16b, 16c, 16d, and 17a, 17b, 17c, 17d, secured in place by plate 18 rigidly secured to core 12. The circuit formed by coils 16a, to 16b inclusive terminates in conductors 19 and 20, and that of coils 17a, to 17d inclusive in conductors 21 and 22.

Rotor 23, interposed between and guided by bearings 8 and 24, comprises shaft 25, rigidly secured to which is spider casting 26 supporting disk 27 by rivets 28, the upper extension of shaft 25 serving to support means to produce mechanical motion, as for example, a crank 29, operating link 30 pivoted to contact bar 31 having contact 31a, and pivoted at 32, also having arm 33, terminating in counterweight 34, normally at rest on stop 35. A more full description of the use of motor 1 will be hereinafter named.

Core 36, comprises plate 37, to which is rigidly attached laminated iron ring 38 composed of outer ring 39, inner ring 40, and laminated section 41, plate 37 having extensions 42, through which studs 3—3 are adapted to pass, nuts 43—43 and 44—44 serving to adjustably hold plate 37 and core 36 in place.

Adjustably secured to plate 37, is bearing support 45, containing bearing 24, screws 46—46, and nuts 47—47, serving to adjustably hold said support in place, said adjustability being obtained by making holes 48 substantially larger in diameter than the diameter of screws 46, in this manner permitting radial adjustment of said support with respect to plate 37, thereby making it possible to align rotor 23 in the air gaps 50 and 51. After final adjustment support 45 may be sealed to plate 37, as for example by the fillet of solder 49.

Air gaps 50 and 51, for purposes of clear illustration, are shown larger than employed in general practice, and, after final adjustment for the desired air gap, nuts 43—43, 44—44 and core 36 are sealed in position, as for example, by the soldered binding 52. Nuts 4 and 5 are likewise sealed by solder fillets 53 and 54. Nuts 47—47 are rigidly attached to plate 37 prior to assembly of core 36.

Felt, or pliable washer 55, serves to keep foreign matter from entering bearing 8.

Motor 1 as described is adapted to actuate contacting mechanism as disclosed in my co-pending application for Letters Patent Serial Number 65,399, filed Oct. 28th, 1925.

The operation of my improved motor is as follows:—Conductors 19 and 20, represent terminals of one winding of a split phase device, as for example the "local winding" of an alternating current track relay employed in signalling practice. Conductors 21 and 22 represent the terminals of the "track" phase of the same relay. To those well versed in the art, the "local" phase is known to be highly reactive, namely has a lagging current, whereas due to the characteristics of the track circuit the "track" phase is only slightly so, this difference of phase of current forming the basis for producing a rotating magnetic field in split phase motors. Referring to Fig. 3, coils 16a, 16b, 16c, and 16d represent the windings, the current through which produces the magnetic flux forming the four poles of the "local" phase of the motor, whereas the coils 17a, 17b, 17c, and 17d, represent the winding, the current through which, produces the magnetic flux forming the four poles of the "track" phase of the motor. The producing of revolving magnetic fluxes in this manner is well known to those versed in the art, but in all motors of which I am aware although a complete revolving field is produced, and although it rotates in a circumferential plane around the axis of the rotor, the lines of magnetic flux passing through the rotor and air-gap, are substantially radial to said axis. In my improved motor however, the complete revolving magnetic field is produced in the same circumferential plane, and the lines of magnetic flux travel substantially in a plane co-axial with the axis of said rotor. By this improved arrangement it is possible to manufacture a motor of very simple construction and of a low manufacturing cost. In addition it is possible to adjust the air-gap as may be desired without the necessity of substituting new stators, rotors and cores. Furthermore, by employing a complete annular revolving magnetic field described in my improvement, it is possible to produce torque in substantially the entire conducting member of the rotor, in this manner reducing the inertia of the rotor, or revolving element.

Furthermore, by operating the motor in a vertical plane and arranging the windings of the stator whereby they are below the plane in which the rotor disk operates, any compound, or paint with which the windings may be treated will not fall onto said rotor from any cause, as for example, over-heating of the winding due to lightning.

Furthermore, by operating the motor in a vertical plane, substantially the entire weight of the rotor is supported by the lower end of its shaft, and by employing a substantially small rounded end, preferably hardened, on said shaft, in combination with a very hard material, as for example a jewel, as a step bearing, the mechanical friction is reduced to a minimum, in this manner obtaining a very high "drop away" percentage, as well as high efficiency of operation.

Furthermore by the novel arrangement of employing an annular disk as the torque producing element of the rotor in combination with what may be termed a pan-cake stator and core, it is possible to look through the entire air-gap at one time, whereby substantially the entire rotor may be seen in operation.

Whereas member 36 has been termed a core for distinction it is however a stator, and if so desired may be made similar to stator 11, including windings, as 56, shown in dotted lines.

Disk 25 of rotor 23, is made of a metal or other substance which is a ready conductor of electricity but is substantially a non-conductor of magnetism. To reduce inertia to a minimum it is preferably made of aluminum or aluminum alloy.

What I claim is:—

1. In an induction motor, in combination, a polyphase stator with projecting pole pieces which are parallel to its longitudinal axis, an annular iron core having projecting pole pieces facing the stator poles in a manner to form an air-gap therebetween, a non-magnetic metal rotor rotatable in the air-gap, and clamping means for tiltingly varying the angularity of the rotating plane of the rotor relative to the plane of the air-gap.

2. In an induction motor, in combination, a polyphase stator having projecting pole pieces parallel to its longitudinal axis, an annular iron core facing the pole pieces in a manner to form an air-gap therebetween, a non-magnetic metal rotor rotatable in the air-gap, and means including a slidable clamp plate for varying the angularity of the axis of the rotor relative to the axes of the stator and core, whereby to centrally dispose the rotor in the air-gap.

3. In an induction motor, in combination, a base, a supporting member parallel to the base and secured thereto, a polyphase stator including energizing coils secured to the supporting member, a second supporting member, threaded post means adjustably securing said second supporting member to the base, an iron core secured to the second supporting member in a manner to form an air-gap between the stator and the core whereby said second supporting member can be adjusted to adjust the width of said air gap, and a non-magnetic metal rotor.

4. In an induction motor, in combination, a base, a supporting member secured to the base, a polyphase stator secured to the supporting member, rods extending up from the base, a second supporting member secured to the rods, an iron core secured to the second supporting member in a manner to form an air-gap between the stator and the core, a non-magnetic rotor supported by the base and positioned to rotate in the air-gap, and clamp nuts on the rods for adjusting the position of the second supporting member, and thereby the relative location of the two members, whereby to vary the width of the air-gap.

5. In an induction motor, in combination, a base, a supporting member secured to the base, a polyphase stator having upstanding pole pieces secured to the supporting member, a second supporting member adjustably secured to the base, an iron core secured to the second supporting member in a manner to form an air-gap between the stator and the core, a non-magnetic rotor supported between the base and said second supporting member and positioned to rotate in the air-gap on an axis substantially parallel with said pole pieces and adjusting means for varying the angularity of the rotating plane of the rotor relative to the plane of said air gap.

6. In an induction motor, in combination, a base, a stator carried by the base, threaded posts clamped to the base, a support plate adjustably clamped to, and carried by, said posts, a magnetic core fixed to said plate and spaced from said stator to thus form an air gap, a cap, means adjustably clamping said cap to said support plate, a spindle pivoted between said cap and said base, and a rotor carried by the spindle and positioned to rotate within said air gap.

7. In an induction motor, in combination, a base, a stator carried by the base, threaded posts clamped to the base, a support plate adjustably clamped to, and carried by, said posts, a magnetic core fixed to said plate and spaced from said stator to thus form an air gap, a cap, bolt and slot means adjustably clamping said cap to said support plate, a spindle pivoted between said cap and said base, and a rotor carried by the spindle and positioned to rotate within said air gap, whereby to permit adjusting the width of said air gap, and the position of said rotor relative to said air gap.

Signed at New York city, in the county of New York and State of New York, this 27th day of October, A. D. 1925.

OSCAR A. ROSS.